(12) United States Patent
Uang

(10) Patent No.: US 9,574,115 B2
(45) Date of Patent: Feb. 21, 2017

(54) RUBBER LAMINATE

(71) Applicant: Yuh-Jye Uang, Taichung (TW)

(72) Inventor: Yuh-Jye Uang, Taichung (TW)

( * ) Notice: Subject to any disclaimer, the term of this patent is extended or adjusted under 35 U.S.C. 154(b) by 56 days.

(21) Appl. No.: 14/814,735

(22) Filed: Jul. 31, 2015

(65) Prior Publication Data

US 2016/0032151 A1 Feb. 4, 2016

Related U.S. Application Data

(60) Provisional application No. 62/031,938, filed on Aug. 1, 2014.

(51) Int. Cl.
| | |
|---|---|
| *B32B 3/00* | (2006.01) |
| *C09J 107/00* | (2006.01) |
| *C09D 107/00* | (2006.01) |
| *C09D 11/108* | (2014.01) |
| *C08L 7/00* | (2006.01) |
| *B60C 1/00* | (2006.01) |
| *C08L 9/06* | (2006.01) |

(52) U.S. Cl.
CPC ............. *C09J 107/00* (2013.01); *B60C 1/00* (2013.01); *C08L 7/00* (2013.01); *C08L 9/06* (2013.01); *C09D 11/108* (2013.01); *C09D 107/00* (2013.01)

(58) Field of Classification Search
CPC ......... B06C 1/00; B06C 13/001; C09J 107/00; C08L 7/00; C08L 9/06; C09D 11/108; C09D 107/00
See application file for complete search history.

(56) References Cited

U.S. PATENT DOCUMENTS

| | | | | |
|---|---|---|---|---|
| 4,252,589 | A | | 2/1981 | Hayakawa et al. |
| 5,358,772 | A | * | 10/1994 | Nakagawa ............ B60C 13/001 152/524 |
| 5,413,652 | A | | 5/1995 | Bohm et al. |
| 5,824,397 | A | * | 10/1998 | Koops ..................... B32B 25/08 203/100 |
| 6,435,376 | B1 | * | 8/2002 | Meshberg ........... B05B 11/0013 222/321.4 |
| 8,834,974 | B1 | * | 9/2014 | Ferry ....................... B41M 1/32 156/240 |
| 2004/0103974 | A1 | * | 6/2004 | Majumdar ................ G09F 3/04 156/110.1 |

FOREIGN PATENT DOCUMENTS

JP 2010125440 6/2010

* cited by examiner

*Primary Examiner* — Elizabeth Mulvaney
(74) *Attorney, Agent, or Firm* — Fishman & Associates, LLC.

(57) ABSTRACT

Provided is a rubber laminate, comprising a vulcanized rubber sheet having a degree of vulcanization in a range from 85% to 95%, a rubberized ink layer, a pressure sensitive adhesive rubber layer and a surface coating layer. The raw materials of the vulcanized rubber sheet, of the rubberized ink layer, and of the pressure sensitive adhesive rubber layer all include an identical rubber composition. Accordingly, the rubber laminate can firmly adhere to a rubber article and does not detach from the rubber article after the vulcanization and inflation of the rubber article.

11 Claims, 1 Drawing Sheet

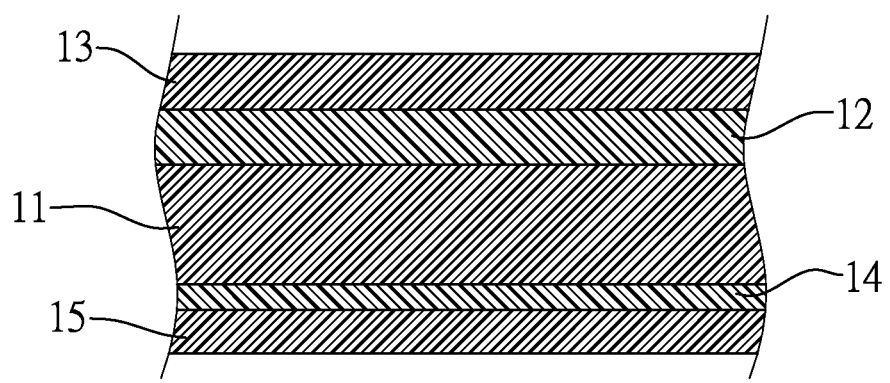

RUBBER LAMINATE

CROSS-REFERENCE TO RELATED APPLICATION

Pursuant to 35 U.S.C. §119(e), this application claims the benefit of the priority to U.S. Provisional Patent Application No. 62/031,938, filed Aug. 1, 2014. The content of the prior application is incorporated herein by its entirety.

BACKGROUND OF THE INVENTION

1. Field of the Invention

The present invention relates to a rubber laminate for adhering onto a rubber article by vulcanization. More particularly, the present invention relates to a rubber laminate as a label for a rubber article.

2. Description of the Prior Arts

In the process of manufacturing a rubber tire, an unvulcanized raw tire is adhered with a label, and then subjected to vulcanization under heat or pressure to adhere the label on the raw tire and produce the rubber tire. With the heat or pressure, the conventional label printed with a desired image or symbol is usually detached from the rubber tire, and thus fails to keep its original image after the vulcanization.

With reference to U.S. Pat. No. 4,252,589, Hayakama et al. disclose that the thin rubber sheet provided with mark indications is partially vulcanized to a degree of vulcanization of 50-80%. If the degree of vulcanization is less than 50%, the thin rubber sheet softens and flows during the vulcanization, and thus the mark indication readily distorts after the vulcanization. The higher degree of vulcanization reduces the tack of the thin rubber sheet. If the degree of vulcanization is over 80%, the stuck rubber sheet does not concentrically deform and further the color patch does not adhere onto the outer layer rubber of the tire side wall when the tire is deformed into the toroidal shape. Both tack and peel strength between rubber sheet and green tire may not be sufficient to resist the inflation, causing the separation of the thin rubber sheet and green tire.

With reference to U.S. Pat. No. 5,413,652, Bohm et, al. disclose a method of applying a white side wall applique to a tire. Before vulcanization, a barrier layer in a range from 0.25 millimeters to 1.77 millimeters and a white decorative rubber layer in a range from 0.76 millimeters to 2.54 millimeters are laminated together. Since the laminate layer is either uncured or only partially cured and the barrier and white decorative rubber layers are too thick, the applique adhered onto the tire is also distorted after vulcanization.

To overcome the shortcomings, the present invention provides a rubber laminate to mitigate or obviate the aforementioned problems.

SUMMARY OF THE INVENTION

An objective of the present invention is to improve the integrity and adhesion of the rubber laminate for allowing the rubber laminate to adhere on a rubber article and display the original clear image of the rubberized ink layer on the rubber article.

Another objective is to ensure the rubber laminate firmly adheres on the rubber article after vulcanization and not separate from the rubber article during the inflation of the rubber article.

To achieve the foregoing objectives, the present invention provides a rubber laminate, comprising:

a vulcanized rubber sheet having an upper side and a lower side, and the degree of vulcanization of the vulcanized rubber sheet ranges from 85% to 95%;

a rubberized ink layer disposed between the upper side of the vulcanized rubber sheet and a surface coating layer; and a pressure sensitive adhesive rubber layer disposed on the lower side of the vulcanized rubber sheet.

A raw material of the vulcanized rubber sheet, a raw material of the rubberized ink layer, and a raw material of the pressure sensitive adhesive rubber layer all include an identical rubber composition.

With the degree of vulcanization, the vulcanized rubber sheet keeps its integrity without any distortion under heat or pressure. Adopting the identical rubber composition improves the compatibility among the vulcanized rubber sheet, the rubberized ink layer, and the pressure sensitive adhesive rubber layer. Accordingly, when the rubber laminate is applied to a rubber article, such as an unvulcanized rubber tire, the rubber laminate comprising the pressure sensitive adhesive rubber layer can firmly adhere to the rubber article after the inflation of the rubber article, and maintain the clear image of the rubberized ink layer after the vulcanization.

In addition to foresaid rubber tire, the rubber laminate also can be applied to other rubber articles, such as rubber hoses, rubber conveyor belt, rubber ball, rubber shoe sole, and rubber shoe sidewall.

Preferably, the rubber composition of the vulcanized rubber sheet, the rubber composition of the rubberized ink layer, and the rubber composition of the pressure sensitive adhesive rubber layer all include a rubber component, a filler, a vulcanizing agent, an accelerator, an activator, a softening agent, a scorch retarder, an antiozonant, and an antioxidant.

Preferably, the rubber component may be a natural rubber, a synthetic rubber, or their combination. The applicable examples of the synthetic rubber may be, but is not limited to: polychloroprene rubber (CR), styrene-butadiene rubber (SBR), polybutadiene (BR), acrylonitrile butadiene rubber (NBR), polyisoprene rubber (IR), butyl rubber (IIR), ethylene propylene diene monomer rubber (EPDM), said synthetic rubber can be used alone or in combination. Preferably, the rubber composition may contain EPDM for improving the weather resistance of the vulcanized rubber sheet.

Preferably, the filler may be, but is not limited to: kaolin clay, mica, titanium dioxide, silica, talc, carbon black, or any combinations thereof. Preferably, the amount of the filler ranges from about 1 part to about 130 parts by weight per 100 parts by weight of the rubber component; and more preferably, 40 parts to about 100 parts by weight per 100 parts by weight of the rubber component.

Preferably, the vulcanizing agent may be sulfur-based vulcanization agent, organic peroxide or their combination, which are optionally added in the rubber composition for making the material more hardened after the heating process. The applicable examples of the sulfur-based vulcanization agent may be, but are not limited to: sulfur and dithiodimorpholine. The vulcanizing agent also may be selenium or tellurium. Preferably, the amount of the vulcanizing agent ranges from 0.25 parts to 5.0 parts by weight per 100 parts by weight of the rubber component. Preferably, the amount of the sulfur-based vulcanization agent ranges from 0.25 parts to 5.0 parts by weight per 100 parts by weight of the rubber component. The applicable examples of the organic peroxide may be, but are not limited to: benzoyl peroxide; dicumyl peroxide, cuemene hydroperoxide and 2,5-dimethyl-2,5-di(t-butylperoxy) hexane. Preferably, the amount of the organic peroxide ranges from 0.3 parts to 3.0 parts by weight per 100 parts by weight of the rubber component.

Preferably, the accelerator may be a thiazole-based vulcanization accelerator, such as 2,2'-dibenzothiazyl disulfide (MBTS), cyclohexylamine salt of mercaptobenzothiazole (CMBT), mercaptobenzothiazole (MBT), or a thiuram-based vulcanization accelerator, such as tetramethylthiuram disulfide (TMTD), tetraethylthiuram disulfide (TETD), tetramethylthiuram monosulfide (TMTM), and dipentamethylenethiuram tetra sulfide (DPTT). Said accelerator can be used alone or in combination. More preferably, the accelerator is 2,2'-dibenzothiaolyl disulfide. Preferably, the amount of the accelerator ranges from about 0.1 parts to about 5 parts by weight per 100 parts by weight of the rubber component; and more preferably, about 0.5 parts to 3.0 parts by weight per 100 parts by weight of the rubber component.

The activator can be added in the rubber composition for modifying the kinetics of the vulcanization process. Preferably, the activator may be zinc oxide, and the amount of the activator ranges from 1.5 parts to 5.0 parts by weight per 100 parts by weight of the rubber component.

Preferably, the softening agent may be, but is not limited to, process oil, liquid paraffin, linseed oil, coconut oil, beewax, carnauba wax, stearic acid, palmitic acid, or any combinations thereof. Preferably, the amount of the softening agent ranges from about 5 parts to 30 parts by weight per 100 parts by weight of the rubber component.

Said scorch retarder can be optionally added in the rubber composition for delaying or preventing scorch. The applicable examples of the scorch retarder may be, but are not limited to, phthalic anhydride, salicylic acid, benzoic acid, N-nitrosodiphenylamine, phthalimidesulfenamide and or their combinations. Preferably, the amount of the scorch retarder ranges from about 0.2 parts to 2.0 parts by weight per 100 parts by weight of the rubber component.

Preferably, the antiozonant may be, but is not limited to: microcrystalline waxes, paraffin waxes, or ozokerite. The waxes are desirably used because they tend to bloom to the surface and protect the rubber immediately below the waxy surface. Preferably, the amount of the antiozonant ranges from 1 part to 4 parts by weight per 100 parts by weight of the rubber component.

The antioxidant can be optionally added in the rubber composition as an aging and fatigue protector. The applicable examples of the antioxidant may be, but are not limited to: N-(1,3-dimethylbutyl)-N'-phenyl-p-phenylenediamine (6PPD), N-N'-diphenyl-p-phenylenediamine (DPPD), octylated diphenylamine(ODPA), 2-mercaptobenzimidazole (MBI), 2,6-di-tert-butyl-p-cresol(BHT) or any combinations thereof. Preferably, the antioxidant is N-N'-diphenyl-p-phenylenediamine or 2-mercaptobenzimidazole. Preferably, the amount of the antioxidant ranges from about 0.5 parts to 4.0 parts by weight per 100 parts by weight of the rubber component.

Preferably, the hardness of the vulcanized rubber sheet ranges from 58 shore A to 64 shore A; and more preferably, from 60 shore A to 62 shore A.

The thickness of the vulcanized rubber sheet can be modified depending on its applications. Preferably, the thickness of the vulcanized rubber sheet ranges from 0.1 millimeters to 0.8 millimeters; and more preferably, from 0.15 millimeters to 0.35 millimeters.

Said pressure sensitive adhesive rubber layer has an upper side and a lower side, the upper side of the pressure sensitive adhesive rubber layer is in contact with the vulcanized rubber sheet, and the lower side is adhered onto the surface of the rubber article. Before applying the rubber laminate onto the rubber article, a releasing layer can be optionally covered on the lower side of the pressure sensitive adhesive rubber layer to protect the pressure sensitive adhesive rubber layer from contamination and keep its tack property.

The raw material of the pressure sensitive adhesive rubber layer includes the foresaid rubber composition, a tackifier, a plasticizer, a silane coupling agent, and a solvent.

Preferably, the thickness of the pressure sensitive adhesive rubber layer ranges from 5 micrometers to 60 micrometers.

Preferably, the tackifier may be, but is not limited to: rosin ester, polymerized rosin, terpene, polyterpene, styrenated terpene, terpene phenolic, and petroleum hydrocarbon. The tackifiers can be used alone or in combination. Preferably, the amount of the tackifier ranges from 20 parts to 80 parts by weight per 100 parts by weight of the rubber component of the rubber composition.

Preferably, the plasticizer may be, but is not limited to, mineral oil, liquid polybutene and liquid isoprene rubber. The plasticizer also can be used alone or in combination. Preferably, the amount of the plasticizer ranges from 10 parts to 70 parts by weight per 100 parts by weight of the rubber component of the rubber composition.

The applicable examples of the silane coupling agent may include thiol, amine, epoxy, or halogen functional group. Preferably, the silane coupling agent is bis(triethoxysilylpropyl) tetrasulfide. Preferably, the amount of the silane coupling agent ranges from 0.05 parts to 4.0 parts by weight per 100 parts by weight of the rubber component of the rubber composition.

Preferably, the solvent for pressure sensitive adhesive rubber layer may be an aliphatic solvent, such as heptane, hexane, pentane, cyclohexane, methyl cyclohexane, or an aromatic solvent, such as xylene, toluene, high flash naphtha, petroleum naphtha, mineral spirits, and the like. The solvents can be used alone or in combination. Preferably, the amount of the solvent ranges from 250 parts to 400 parts by weight per 100 parts by weight of the rubber component of the rubber composition.

The raw material of the rubberized ink layer includes the foresaid rubber composition and a solvent.

Said rubber composition of the rubberized ink layer includes any kind of the foresaid filler except for the carbon black. Preferably, the filler of the rubber composition for the vulcanized rubber sheet and the rubberized ink layer is silica. When the filler is also used as a white pigment, the amount of the filler preferably ranges from 40 parts to 130 parts by weight per 100 parts by weight of the rubber component. When the filler is also used as a coloring pigment, such as blue, red, yellow, green pigments, the amount of the filler ranges from 1 part to 45 parts by weight per 100 parts by weight of the rubber component.

Preferably, the coloring pigment may be, but is not limited to: titanium dioxide, magnesium oxide, calcium carbonate, clay, talc.

Preferably, the solvent for rubberized ink layer may be an aliphatic solvent, such as heptane, hexane, pentane, cyclohexane, methyl cyclohexane, or an aromatic solvent, such as xylene, toluene, high flash naphtha, petroleum naphtha, mineral spirits, and the like. The solvents can be used alone or in combination. Preferably, the amount of the solvent ranges from 150 parts to 450 parts by weight per 100 parts by weight of the rubber component of the rubber composition.

The surface coating layer with elasticity and impact and abrasion resistance is adopted to protect the rubberized ink layer. The raw material of the surface coating layer includes resin, an ultraviolet absorber, and a solvent.

The resin of the surface coating layer may be, but is not limited to: polyurethane resin, acrylic resin, epoxy resin, silicone resin, or any combinations thereof. Said resin can be used alone or in combination. Preferably, the amount of the resin ranges from 20 parts to 40 parts by weight.

The ultraviolet absorber of the surface coating layer may be, but is not limited to: benzotriazol-based compound, benzophenone-based compound, and cyanoacrylate-based compound, or any combinations thereof. The applicable examples of the ultraviolet absorber may be 2-[2-hydroxy-3,5-di(1,1-dimethylbenzyl)]-2H-benzotriazol, 2-(2'-hydroxy-3',5'-di-tert-amylphenyl)benzotriazole; 2-hydroxy-4-n-octoxybenzophenone; 2-propenoic acid, 2-cyano-3,3-diphenyl-, ethyl ester. Preferably, the amount of the ultraviolet absorber ranges from 0.5 parts to 4.0 parts by weight.

Preferably, the solvent for the surface coating layer may be foresaid aliphatic or aromatic solvent. The solvents can be used alone or in combination. Preferably, the amount of the solvent ranges from 250 parts to 350 parts by weight.

Preferably, the rubberized ink layer and the surface coating layer can be made by a screen printing process or a gravure printing process.

Other objectives, advantages and novel features of the invention will become more apparent from the following detailed description when taken in conjunction with the accompanying drawings.

BRIEF DESCRIPTION OF THE DRAWING

FIG. 1 is a side view of a rubber laminate of Example 1 in accordance with the present invention.

DETAILED DESCRIPTION OF THE PREFERRED EMBODIMENTS

EXAMPLE 1

1. Rubber Composition

The rubber composition used in Example 1 comprised 60 kg of the natural rubber, 30 kg of SBR 1502, 5 kg of mineral oil (acting as a plasticizer), 2 kg of stearic acid (acting as a softening agent), 1.5 kg of microcrystalline wax (act as an antiozonant), 3 kg of zinc oxide (acting as an activator), 1.5 kg of sulfur (acting as a vulcanizing agent), 1 kg of 2,2'-dibenzothiaolyl disulfide (MBTS, acting as an accelerator), and 0.2 kg of Irganox 1010 (acting as an antioxidant). Said rubber composition was used for preparing the vulcanized rubber sheet, the pressure sensitive adhesive rubber layer, and the rubberized ink layer as described below.

2. Preparation Method:

First, 101.2 kg of the rubber composition, 20 kg of EPDM, and 50 kg of carbon black were mixed with kneader, and then calendered to obtain uncured rubber sheet.

Next, the uncured rubber sheet was placed between two steam rollers at 170° C. for solidification directly, so as to form 0.25 mm-thick of the vulcanized rubber sheet. The degree of vulcanization of the vulcanized rubber sheet was 90%, and the hardness of the vulcanized rubber sheet was 62 shore A.

In practice, the another uncured rubber sheet of rubber laminate was sulfur cured prior to solidification to a degree of vulcanization about 90 percent of its rheometric maximum torque and minimum torque according to ASTM D5289 as determined by a moving die rheometer (MDR), Model EKT-2003S rheometer from EKTRON TEK. Such MDR was used to determine the cure characteristic of rubber composition, including maximum and minimum torque values, so as to achieve the degree of vulcanization being 90% under 170° C.

Then 2.5 kg of another rubber composition of foresaid composition was mixed with 1.25 kg of carbon black, 1.3 kg of hydrocarbon resin (acting as a tackifier), 0.45 kg of polybutene (acting as a plasticizer), 0.05 kg of bis(triethoxysilylpropyl) tetrasulfide (acting as a silane coupling agent), and 6.7 kg of rubber solvent (acting as a solvent) to form a mixture. The mixture was coated onto one side of the vulcanized rubber sheet and dried to form a 0.05 mm-thick of the pressure sensitive adhesive rubber layer on the vulcanized rubber sheet. The initial tack of pressure sensitive adhesive rubber layer was J DOW No. 12 and measured by J DOW; the 180° peel strength was 1.33 kg/inch, 90° peel strength was 1.15 kg/inch and both were measured by PSTC-101 method.

Subsequently, the other side of the vulcanized rubber sheet was applied with a 4 μm-thick of the rubberized ink layer by screen printing method. Said rubberized ink layer was made of 0.25 kg of foresaid rubber composition, 0.12 kg of silica, 0.45 kg of titanium dioxide (acting as a coloring pigment), and 0.64 kg of xylene (acting as a solvent).

Finally, a 2 μm-thick of surface coating layer was applied on top of the rubberized ink layer, and then die cut to obtain a desired rubber laminate.

As shown in FIG. 1, the rubber laminate produced by the method comprises a vulcanized rubber sheet 11, a rubberized ink layer 12, a surface coating layer 13, and a pressure sensitive adhesive rubber layer 14. The vulcanized rubber sheet 11 is disposed between the rubberized ink layer 12 and the pressure sensitive adhesive rubber layer 14, and the surface coating layer 13 is disposed on the rubberized ink layer 12 opposite the vulcanized rubber sheet 11.

By means of foresaid technical features, the rubber laminate with improved tack and peel strength firmly adheres to a rubber article after the inflation of the rubber article, and the vulcanized rubber sheet of said degree of the vulcanization keeps its integrity during inflation and vulcanization. Therefore, the rubber laminate maintains the clear image of the rubberized ink layer without any distortion after the vulcanization.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A rubber laminate, comprising:
   a vulcanized rubber sheet having an upper side and a lower side, a degree of vulcanization of the vulcanized rubber sheet ranging from 85% to 95%;
   a rubberized ink layer disposed between the upper side of the vulcanized rubber sheet and a surface coating layer; and
   a pressure sensitive adhesive rubber layer disposed on the lower side of the vulcanized rubber sheet;
   wherein a raw material of the vulcanized rubber sheet, a raw material of the rubberized ink layer, and a raw material of the pressure sensitive adhesive rubber layer include an identical rubber composition.

2. The rubber laminate as claimed in claim 1, wherein the hardness of the vulcanized rubber sheet ranges from 58 shore A to 64 shore A.

3. The rubber laminate as claimed in claim 1, wherein the rubber composition includes:
 a rubber component selected from the group consisting of a natural rubber, a synthetic rubber, and their combination;
 a filler selected from the group consisting of clay, mica, titanium dioxide, silica, talc, carbon black, and any combinations thereof;
 a vulcanizing agent comprising a sulfur-based vulcanization agent, an organic peroxide, or their combination;
 an accelerator comprising a thiazole-based vulcanization accelerator, a thiuram-based vulcanization accelerator, or their combination;
 an activator comprising zinc oxide;
 a softening agent selected from the group consisting of process oil, liquid paraffin, linseed oil, coconut oil, beewax, carnauba wax, stearic acid, palmitic acid, and any combinations thereof;
 a scorch retarder selected from the group consisting of phthalic anhydride, salicylic acid, benzoic acid, N-nitrosodiphenylamine, and any combinations thereof;
 an antiozonant selected from the group consisting of microcrystalline waxes, paraffin waxes, ozokerite, and any combinations thereof; and
 an antioxidant selected from the group consisting of N-(1,3-dimethylbutyl)-N'-phenyl-p-phenylenediamine (6PPD), N-N'-diphenyl-p-phenylenediamine (DPPD), octylated diphenylamine(ODPA), 2-mercaptobenzimidazole(MBI), 2,6-di-tert-butyl-p-cresol(BHT), and their combination.

4. The rubber laminate as claimed in claim 3, wherein the rubber composition includes 40 parts to 100 parts by weight of the filler, 0.25 parts to 5.0 parts by weight of the vulcanizing agent, 0.1 parts to 5 parts by weight of the accelerator, 1.5 parts to 5.0 parts by weight of the activator, 5 parts to 30 parts by weight of the softening agent, 0.2 parts to 2.0 parts by weight of the scorch retarder, 1 part to 4 parts by weight of the antiozonant, and 0.5 parts to 4.0 parts by weight of the antioxidant based on 100 parts by weight of the rubber component.

5. The rubber laminate as claimed in claim 1, wherein the thickness of the vulcanized rubber sheet ranges from 0.1 millimeters to 0.8 millimeters, and the thickness of the pressure sensitive adhesive rubber layer ranges from 5 micrometers to 60 micrometers.

6. The rubber laminate as claimed in claim 3, wherein the raw material of the pressure sensitive adhesive rubber layer includes:
 the rubber composition;
 a tackifier selected from the group consisting of rosin ester, polyterpene, petroleum hydrocarbon, and any combinations thereof;
 a plasticizer comprising mineral oil or liquid polybutene;
 a silane coupling agent comprising bis(triethoxysilylpropyl) tetrasulfide; and
 a solvent selected from the group consisting of aliphatic solvent, aromatic solvent, and their combination.

7. The rubber laminate as claimed in claim 6, wherein the raw material of the pressure sensitive adhesive rubber layer includes 20 parts to 80 parts by weight of the tackifier, 10 parts to 70 parts by weight of the plasticizer, 0.05 parts to 4.0 parts by weight of the silane coupling agent, and 250 parts to 400 parts by weight of the solvent based on 100 parts by weight of the rubber component of the rubber composition.

8. The rubber laminate as claimed in claim 3, wherein the raw material of the rubberized ink layer includes the rubber composition and a solvent.

9. The rubber laminate as claimed in claim 8, wherein the filler of the rubber composition is silica.

10. The rubber laminate as claimed in claim 1, wherein the rubberized ink layer is made by a screen printing process or a gravure printing process.

11. The rubber laminate as claimed in claim 1, wherein the surface coating layer includes:
 20 parts to 40 parts by weight of a resin, wherein the resin is selected from the group consisting of polyurethane resin, acrylic resin, epoxy resin, silicone resin, and any combinations thereof;
 0.5 parts to 4.0 parts by weight of an ultraviolet absorber, wherein the ultraviolet absorber is selected from the group consisting of benzotriazol-based compound, benzophenone-based compound, and cyanoacrylate-based compound, and any combinations thereof; and
 250 parts to 350 parts by weight of a solvent.

* * * * *